United States Patent
Bhojan

(10) Patent No.: US 10,223,240 B2
(45) Date of Patent: Mar. 5, 2019

(54) METHODS AND SYSTEMS FOR AUTOMATING REGRESSION TESTING OF A SOFTWARE APPLICATION

(71) Applicant: Wipro Limited, Bangalore (IN)

(72) Inventor: Rajkumar Joghee Bhojan, Sharon, MA (US)

(73) Assignee: Wipro Limited, Bangalore (IN)

( * ) Notice: Subject to any disclaimer, the term of this patent is extended or adjusted under 35 U.S.C. 154(b) by 65 days.

(21) Appl. No.: 15/421,087

(22) Filed: Jan. 31, 2017

(65) Prior Publication Data

US 2018/0217920 A1 Aug. 2, 2018

(51) Int. Cl.
*G06F 11/36* (2006.01)

(52) U.S. Cl.
CPC .......... *G06F 11/3664* (2013.01); *G06F 11/36* (2013.01); *G06F 11/3612* (2013.01); *G06F 11/3668* (2013.01); *G06F 11/3672* (2013.01); *G06F 11/3684* (2013.01); *G06F 11/3688* (2013.01); *G06F 11/3692* (2013.01); *G06F 11/3696* (2013.01)

(58) Field of Classification Search
None
See application file for complete search history.

(56) References Cited

U.S. PATENT DOCUMENTS

| | | | |
|---|---|---|---|
| 9,317,412 B1 * | 4/2016 | Cohen | G06F 11/3688 |
| 2005/0154769 A1 * | 7/2005 | Eckart | G06Q 40/04 |
| 2008/0072050 A1 * | 3/2008 | Klonover | H04L 43/50 713/176 |
| 2013/0339930 A1 * | 12/2013 | Xu | G06F 11/3684 717/125 |
| 2017/0109270 A1 * | 4/2017 | Ekambaram | G06F 11/3688 |
| 2018/0052764 A1 * | 2/2018 | Kaser | G06F 11/3684 |

FOREIGN PATENT DOCUMENTS

CN 104809068 A 7/2015

* cited by examiner

*Primary Examiner* — Lewis A Bullock, Jr.
*Assistant Examiner* — Mark A Gooray
(74) *Attorney, Agent, or Firm* — LeClairRyan PLLC

(57) ABSTRACT

In one embodiment, a method for automating regression testing of a software application is disclosed. The method includes receiving, by a test automation system, input data associated with the regression testing of the software application and predicting, by the test automation system, a test automation framework for execution of a regression test suite by analyzing the input data. Further, the method includes obtaining, by the test automation system, test scenarios from execution of historical regression test suites upon predicting the test automation framework and identifying, by the test automation system, availability of devices for executing each test scenario based on one or more device parameters. Further, the method includes transmitting, by the test automation system, information corresponding to the test scenarios to the identified devices based on the availability to automate the regression testing of the software application.

20 Claims, 3 Drawing Sheets

METHODS AND SYSTEMS FOR AUTOMATING REGRESSION TESTING OF A SOFTWARE APPLICATION

FIELD OF THE INVENTION

This disclosure relates generally to software testing, and more particularly to methods and systems for automating regression testing of a software application.

BACKGROUND

In an ever increasing endeavor to improve quality of software testing, automation of regression testing is essential. The automation of the regression testing of a software application includes using an optimal test automation framework along with suitable test scenarios. The building of the test automation framework is a technically complex and time consuming task. Also, the complexities in building of the test automation framework increase with increase in number of parameters associated with the software application.

The existing systems for automating regression testing encounter various technical challenges while building the test automation framework in system testing. The system testing is a software testing wherein a complete and integrated software application is tested. Moreover, the system testing may include multiple types of software applications such as a web based application, a windows applications, or a main-frame application. The output of a web based application may be provided as an input to main-frame application. It is a possibility that one or more different software applications may be involved in one or more processes. The test automation framework built for web based applications may not be suitable for the test automation framework used for the main-framework applications. Therefore, finding a holistic approach of building test automation framework for all types of software applications or behaviors is a big challenge.

Moreover, technical complexities may increase during integration testing or system testing. In the integration testing, individual modules of software application are first tested in isolation. After the modules are unit tested, the modules are integrated sequentially, till all the modules are integrated, and validated if requirements are implemented correctly. Moreover, the integration testing is not performed at end of a software development cycle, rather it is performed simultaneously with development of the software application. Thus, few modules may not be available for testing. Therefore, the technical challenge for building the test automation framework is present in identifying the test automation framework for the modules which does not exist at the time of testing.

Additionally, technical challenges arise when test automation has to be performed in agile projects wherein software application development and testing is conducted concurrently. In such circumstances, software application objects may not be available during a sprint. The technical challenge is present in building a test automation framework for testing the software applications where objects are not visible. Also, technical complexities are increased when multiple types of testing are involved. For example, first part of testing may be functional testing, second part of the testing may be performance testing, and third part of the testing may be service based testing. In such scenarios, building a common test automation framework may be complex and time consuming.

SUMMARY

In one embodiment, a method for automating regression testing of a software application is disclosed. The method includes receiving, by a test automation system, input data associated with the regression testing of the software application and predicting, by the test automation system, a test automation framework for execution of a regression test suite by analyzing the input data. Further, the method includes obtaining, by the test automation system, one or more test scenarios from execution of historical regression test suites upon predicting the test automation framework and identifying, by the test automation system, availability of one or more devices for executing each test scenario of the one or more test scenarios based on one or more device parameters. Further, the method includes transmitting, by the test automation system, information corresponding to the one or more test scenarios to the one or more identified devices based on the availability to automate the regression testing of the software application.

In one embodiment, a test automation system for automating regression testing of a software application is disclosed. The test automation system includes a processor and a memory communicatively coupled to the processor. The memory stores processor instructions, which, on execution, causes the processor to receive input data associated with the regression testing of the software application and predict a test automation framework for execution of a regression test suite by analyzing the input data. The instructions further cause the processor to obtain one or more test scenarios from execution of historical regression test suites upon predicting the test automation framework and identify availability of one or more devices for executing each test scenario of the one or more test scenarios based on one or more device parameters. The instructions further cause the processor to transmit information corresponding to the one or more test scenarios to the one or more identified devices based on the availability to automate the regression testing of the software application.

In one embodiment, a non-transitory computer readable medium is disclosed. The non-transitory computer readable medium includes instructions stored thereon that when processed by at least one processor cause a device to perform operations including receiving input data associated with the regression testing of the software application and predicting a test automation framework for execution of a regression test suite by analyzing the input data. The operations further include obtaining one or more test scenarios from execution of historical regression test suites upon predicting the test automation framework and identifying availability of one or more devices for executing each test scenario of the one or more test scenarios based on one or more device parameters. The operations further include transmitting information corresponding to the one or more test scenarios to the one or more identified devices based on the availability to automate the regression testing of the software application.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present subject matter discloses systems and methods for automating regression testing of a software application. The systems and methods may be implemented in a variety of computing systems. The computing systems that can implement the described method(s) include, but are not limited to a server, a desktop personal computer, a notebook or a portable computer, hand-held devices, and a mainframe computer. Although the description herein is with reference to certain computing systems, the systems and methods may be implemented in other computing systems, albeit with a few variations, as will be understood by a person skilled in the art.

Figure 1:
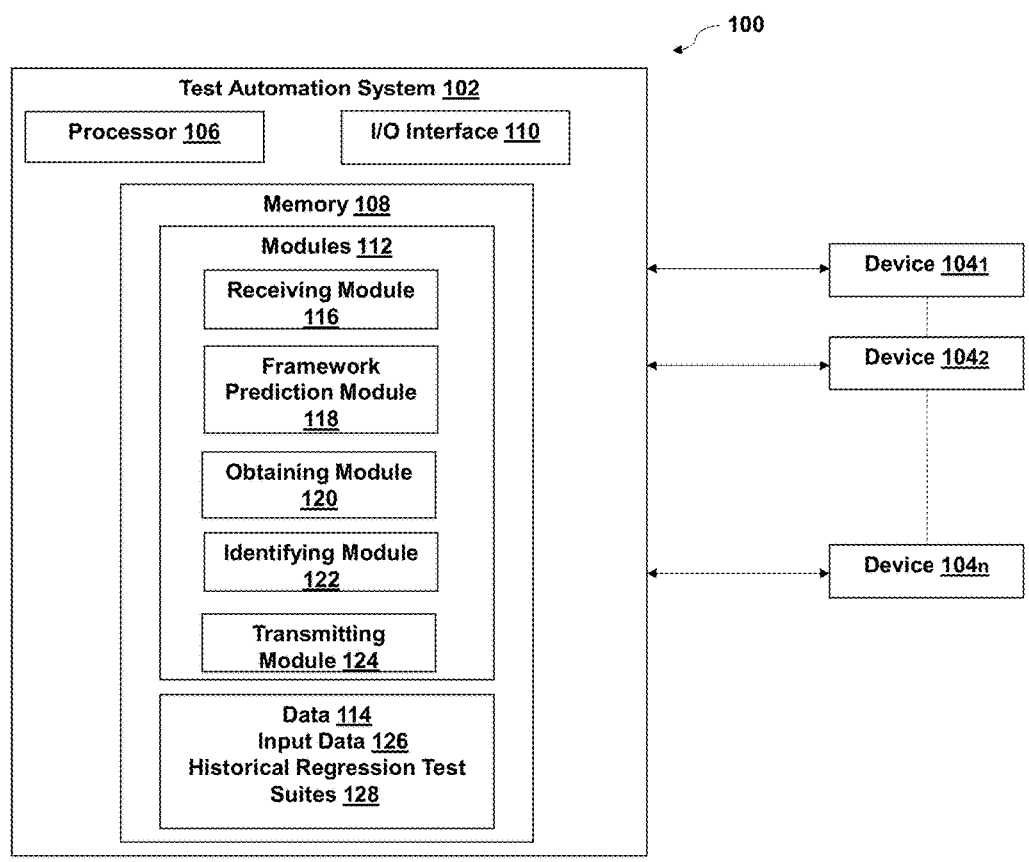
FIG. 1 illustrates an exemplary network implementation comprising a test automation system for automating regression testing of a software application, according to some embodiments of the present disclosure.
Figure 2:
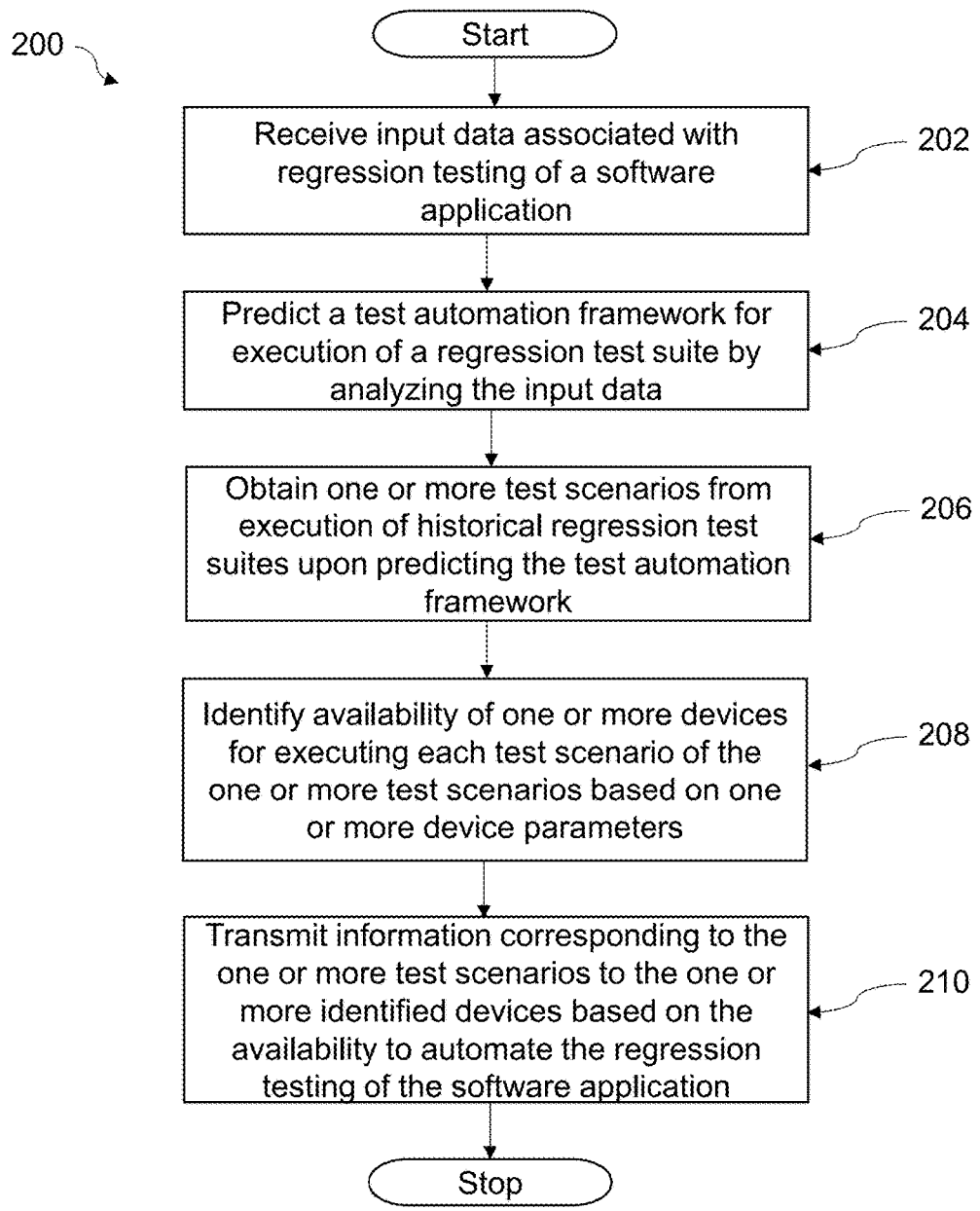
FIG. 2 is a flow diagram illustrating a method for automating regression testing of a software application in accordance with some embodiments of the present disclosure.
Figure 3:
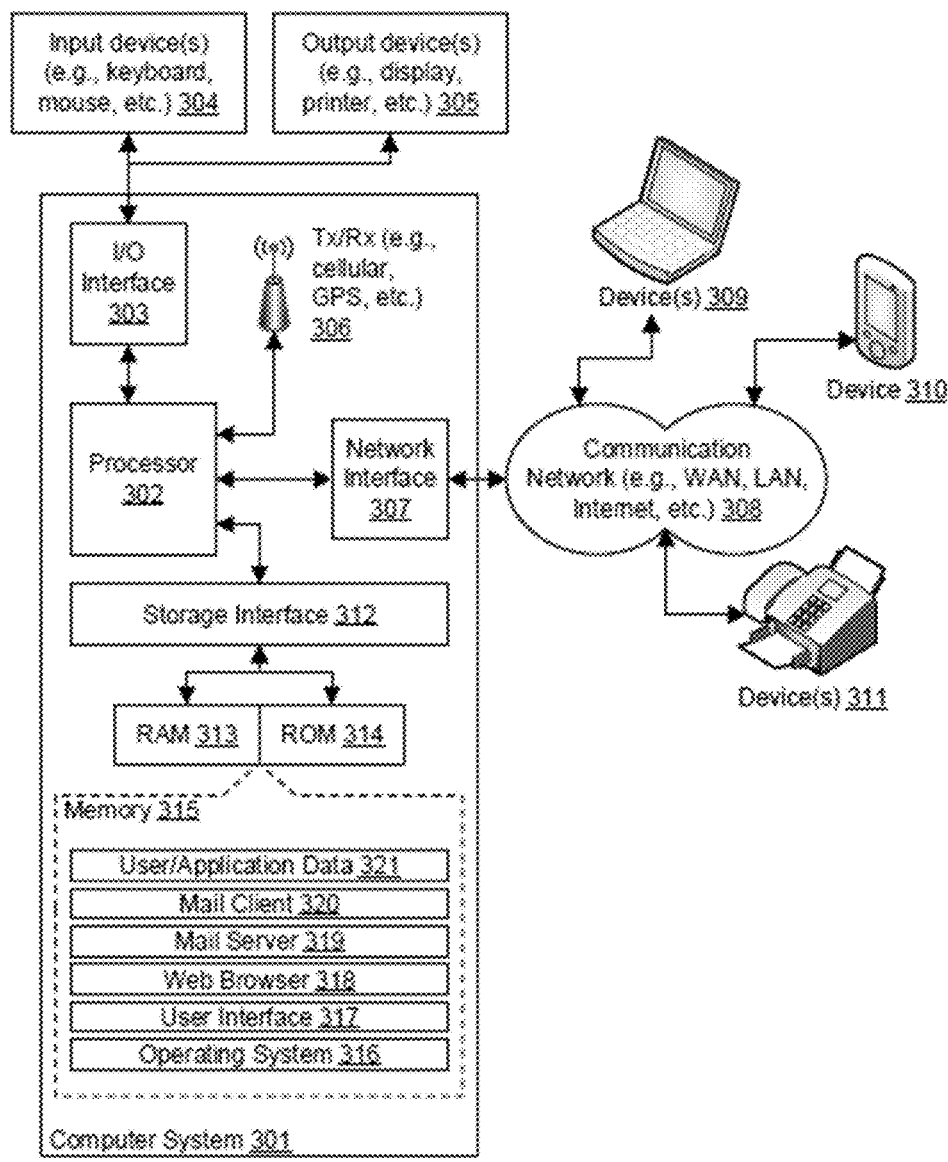
FIG. 3 is a block diagram of an exemplary computer system for implementing embodiments consistent with the present disclosure.

Working of the systems and methods for automating regression testing of the software application is described in conjunction with FIGS. 1-3. It should be noted that the description and drawings merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and are to be construed as being without limitation to such specifically recited examples and conditions. Moreover, all statements herein reciting principles, aspects, and embodiments of the present subject matter, as well as specific examples thereof, are intended to encompass equivalents thereof. While aspects of the systems and methods can be implemented in any number of different computing systems environments, and/or configurations, the embodiments are described in the context of the following exemplary system architecture(s).

FIG. 1 illustrates an exemplary network implementation 100 comprising a test automation system 102 for automating regression testing of a software application, according to some embodiments of the present disclosure. As shown in the FIG. 1, the test automation system 102 is communicatively coupled to one or more devices 1041, 1042, . . . 104n. Hereinafter, the one or more devices may be referred as the one or more devices 104 or devices 104. The regression testing of the software application may be automated by executing various test scenarios on the one or more devices 104.

The test automation system 102 may be communicatively coupled to the devices 104 through a network. The network may be a wireless network, wired network or a combination thereof. The network can be implemented as one of the different types of networks, such as intranet, local area network (LAN), wide area network (WAN), the internet, and such. The network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network may include a variety of network devices, including routers, bridges, servers, computing devices, storage devices, etc.

As shown in the FIG. 1, the test automation system 102 comprises a processor 106, a memory 108 coupled to the processor 106, and input/output (I/O) interface(s) 110. The processor 106 may be implemented as one or more microprocessors, microcomputers, microcontrollers, digital signal processors, central processing units, state machines, logic circuitries, and/or any devices that manipulate signals based on operational instructions. Among other capabilities, the processor 106 is configured to fetch and execute computer-readable instructions stored in the memory 108. The memory 108 can include any non-transitory computer-readable medium known in the art including, for example, volatile memory (e.g., RAM), and/or non-volatile memory (e.g., EPROM, flash memory, etc.).

The I/O interface(s) 110 may include a variety of software and hardware interfaces, for example, a web interface, a graphical user interface, etc., allowing the test automation system 102 to interact with the devices 104. Further, the I/O interface(s) 110 may enable the test automation system 102 to communicate with other computing devices. The I/O interface(s) 110 can facilitate multiple communications within a wide variety of networks and protocol types, including wired networks, for example LAN, cable, etc., and wireless networks such as WLAN, cellular, or satellite. The I/O interface(s) 110 may include one or more ports for connecting a number of devices to each other or to another server.

In one implementation, the memory 108 includes modules 112 and data 114. In one example, the modules 112, amongst other things, include routines, programs, objects, components, and data structures, which perform particular tasks or implement particular abstract data types. The modules 112 may also be implemented as, signal processor(s), state machine(s), logic circuitries, and/or any other device or component that manipulate signals based on operational instructions. Further, the modules 112 can be implemented by one or more hardware components, by computer-readable instructions executed by a processing unit, or by a combination thereof.

In one implementation, the data 114 serves, amongst other things, as a repository for storing data fetched, processed, received and generated by one or more of the modules 112. The data 114 may include input data 126 provided by the user through the I/O interface 110. Herein after, the input data may be referred as the input data. The data 114 may also include historical regression test suites 128. The historical regression test suites 128 may include test scenarios used for regression testing of software applications in different execution cycles. Herein after, the historical regression test suites 128 may be referred as historical regression test suites.

In one embodiment, the data 114 may be stored in the memory 108 in the form of various data structures. Additionally, the aforementioned data can be organized using data models, such as relational or hierarchical data models. In an example, the data 114 may also comprise other data used to store data, including temporary data and temporary files, generated by the modules 112 for performing the various functions of the test automation system 102.

In one implementation, the modules 112 further include a receiving module 116, a framework prediction module 118, an obtaining module 120, an identifying module 122, and a transmitting module 124. In an example, the modules 112 may also comprise other modules. The other modules may perform various miscellaneous functionalities of the test automation system 102. It will be appreciated that such aforementioned modules may be represented as a single module or a combination of different modules.

In order to automate regression testing of the software application, the receiving module 116 may receive input data associated with the regression testing of the software application. In one embodiment, the input data may be provided by a user through the I/O interface 110 of the test automation system 102. The input data may include software application type, scripting language used in development of the software application, data source, tools, report type, and testing type. In an example, the software application type may be, but is not limited to, a free application software, a business software such as Business to Business (B2B), Business to Customer (B2C), Customer to Business (C2B), and Customer to Customer (C2C), a banking software, a government software, an industrial software, a video software, a legal software, an educational software, a communication software, an entertainment software, a genealogy software, a multimedia software, a science software, a chemical engineering software, mobile applications, or legacy applications. Additionally, the software application types may be, but is not limited to, system applications, boot loaders, compatibility layers, device drivers, firmware, graphical user interfaces, middleware, operating systems, utility software, and Windowing systems.

In an example, the scripting language used in development of the software application may be, but is not limited to, Java, Dot Net Visual Basic (VB), Python, Perl, Hypertext Preprocessor (PHP), C/C++, Ruby, 4Test, R, or Scala. Further, the data sources used in the regression testing may be, but is not limited to, excel sheets, text files, eXtensible Markup Language (XML) files, image files, word Files, or Portable Document Format (PDF) files. Moreover, the tools which may be used for performing regression testing may include, but is not limited to, Selenium, Unified Functional Testing (UFT), Rational Functional Tester (RFT), Silk Test, Squish, Rational Performance Tester, EggPlant, Test Anywhere, Load Runner, Ranorex, or Test complete. The report type may be, but is not limited to, Hyper Text Markup Language (HTML), PDF, excel, text reports, word file reports, and PowerPoint presentation based reports. Moreover, the testing type may be, but is not limited to, functional testing, User acceptance testing (UAT), system testing, integration testing, performance testing, data centric testing, service virtualized testing, Structured Query Language (SQL) injection testing, or sanity testing.

Upon receiving the input data by the receiving module 116, the framework prediction module 118 may predict a test automation framework for execution of a regression test suite by analyzing the input data. In order to predict an optimal test automation framework from a set of test automation frameworks, the framework prediction module 118 may implement a machine learning algorithm. In one embodiment, Naïve Bayes algorithm may be implemented for predicting the test automation framework. The framework prediction module 118 may predict the test automation framework by analyzing the input data in reference with a training data set. In an example, the training data set may be a data set depicted in Table 1 shown below.

TABLE 1

| Input Parameters for Framework (Input Data) | | | | | | Predicted Test Automation Framework |
|---|---|---|---|---|---|---|
| Application Type | Tool | Scripting Language | Reporting | Test Data | Repository | Framework Type |
| Web | Cucumber | Java | Html | XML | No | Hybrid |
| Web | UFT | VB | Html | Excel | Yes | Hybrid |
| Mainframe | UFT | VB | Html | Excel | Yes | Modular |
| Windows | UFT | VB | Word Doc | Excel | Yes | Keyword |
| Web | RFT | Java | Html | XML | Yes | Hybrid |
| Web | RFT | Csharp | Html | Excel | Yes | Hybrid |
| Mobile | Selenium | Python | PDF | Text (TXT) | No | Hybrid |
| Web | Selenium | PHP | Html | Excel | No | Modular |
| Web | Selenium | Perl | Excel | XML | No | Modular |
| Web | Selenium | Csharp | PDF | Excel | No | Keyword |
| Web | Selenium | Ruby | Html | TXT | No | Modular |
| Web | Selenium | JavaScript | Html | TXT | No | Modular |
| Web | Silk Test | 4Test | PDF | Excel | Yes | Hybrid |
| Flex | Ranorex | Java | Html | TXT | Yes | Data Driven |
| Mobile | SeeTest | Junit | Html | Excel | Yes | BDD |

As shown in the Table 1, the predicted test automation framework may vary based on the input data. The predicted test automation framework may be a hybrid framework, a modular framework, a keyword framework, a data driven framework, or a Behavior Driven Development (BDD) framework. In one example, if the application type is Web, the tool is Cucumber, the scripting language is Java, the reporting type is HTML, and the test data type is text data, the optimal test automation framework may be the hybrid framework. The training data set shown in the Table 1 may be provided as an input to the framework prediction module 118 along with the input data. The framework prediction module 118 may implement the Naive Bayes algorithm which is a powerful non-linear algorithm for predictive modeling. The Naive Bayes algorithm predicts a hypothesis (c) given input data (x). Here, the hypothesis may be the test automation framework and the input data is the input data provided by the user.

In a classification problem, the hypothesis (c) may be a class assigned for a new data instance (x). Bayes' theorem provides a way to calculate probability of hypothesis given prior knowledge. Bayes' theorem may be stated as, $$P(C|X) = P(X|C) \times P(C)/P(X) \quad (1)$$

i.e. Posterior=Likelihood×Prior/Evidence (2)

Where,
P (C|X) is the probability of hypothesis c given the input data x. This may be denoted as posterior probability.
P (X|C) is the probability of the input data x given that the hypothesis c was true.
P (C) is the probability of hypothesis c being true (regardless of the input data). This may be denoted as prior probability.
P (X) is the probability of the input data (regardless of the hypothesis).

According to the equation 2, Posterior=Likelihood×Prior/Evidence. The equation 2 may be extended as, $$P(C \mid X_1, X_2, \ldots, X_n) = \frac{P(X_1, X_2, \ldots X_n \mid C)P(C)}{P(X_1, X_2, \ldots, X_n)} \quad (3)$$

The training data set depicted in the Table 1 implies that input data comprises of five parameters. Therefore, the framework prediction module 118 may create look-up tables/frequency tables for each parameter of the input data and compute probability of predicting each type of test automation framework based on each parameter. The frequency tables for each parameter of the input data may be dynamically modified based on the training data set provided as an input to the framework prediction module 118.

The frequency of a particular data value is a number of times the data value occurs. Therefore, the frequency of each parameter of the input data may be computed based on the number of times it occurs in the training data set. In an example, the frequency of each parameter of the input data is computed for hybrid framework and non-hybrid framework. The Table 2, Table 3, Table 4, Table 5, and Table 6 may represent the frequency tables which provide the frequency values for each parameter of the input data.

TABLE 2

| Application Type | Hybrid | Non-Hybrid | Total |
|---|---|---|---|
| Web | 5/5 | 5/10 | 10/15 |
| Mainframe | 0/5 | 1/10 | 1/15 |
| Windows | 0/5 | 1/10 | 1/15 |
| Flex | 0/5 | 1/10 | 1/15 |
| Mobile | 1/5 | 1/10 | 2/15 |

Table 2 depicts that for 5 occurrences of Application type 'Web', the hybrid framework may be predicted as the test automation framework. Similarly, for 1 occurrence of "Mobile" application type, the hybrid framework may be predicted as the test automation framework.

TABLE 3

| Tool | Hybrid | Non-Hybrid | Total |
|---|---|---|---|
| Cucumber | 0/5 | 1/10 | 1/15 |
| UFT | 1/5 | 2/10 | 3/15 |
| Selenium | 1/5 | 5/10 | 6/15 |
| RFT | 2/5 | 0/10 | 2/15 |
| Silk Test | 1/5 | 0/10 | 1/15 |
| SeeTest | 0/5 | 1/10 | 1/15 |
| Ranorex | 0/5 | 1/10 | 1/15 |

The Table 3 depicts that, for 2 occurrences of RFT tool, the hybrid framework may be predicted as the test automation framework.

TABLE 4

| Scripting Language | Hybrid | Non-Hybrid | Total |
|---|---|---|---|
| Java | 1/5 | 2/10 | 3/15 |
| VB | 1/5 | 2/10 | 3/15 |
| Csharp | 1/5 | 1/10 | 2/15 |
| Python | 1/5 | 0/10 | 1/15 |
| Perl | 0/5 | 1/10 | 2/15 |
| PHP | 0/5 | 1/10 | 1/15 |
| Ruby | 0/5 | 1/10 | 1/15 |
| JavaScript | 0/5 | 1/10 | 1/15 |
| 4Test | 1/5 | 0/10 | 1/15 |
| Junit | 0/5 | 1/10 | 1/15 |

The Table 4 depicts that for 1 occurrence of Java as the scripting language, the hybrid framework may be predicted as the test automation framework.

TABLE 5

| Reporting Type | Hybrid | Non-Hybrid | Total |
|---|---|---|---|
| HTML | 3/5 | 7/10 | 10/15 |
| PDF | 2/5 | 1/10 | 3/15 |
| Excel | 0/5 | 1/10 | 1/15 |
| MS Word | 0/5 | 1/10 | 1/15 |

The Table 5 depicts that for 3 occurrences of HTML, the hybrid framework may be predicted as the test automation framework.

TABLE 6

| Test Data | Hybrid | Non-Hybrid | Total |
|---|---|---|---|
| XML | 1/5 | 2/10 | 3/15 |
| TXT | 1/5 | 3/10 | 4/15 |
| Excel | 3/5 | 5/10 | 8/15 |

The Table 6 depicts that for 3 occurrences of excel as the test data, the hybrid framework may be predicted as the test automation framework.

Upon creating the frequency tables for each parameter of the input data based on the training data set, the framework prediction module 118 may compute the probability of predicting a test automation framework by analyzing the input data by referring to the frequency tables and the training data set. In one example, consider that the framework prediction module 118 has to compute the probability of predicting a hybrid framework (probability of hybrid framework) and a probability of predicting a non-hybrid framework (probability of non-hybrid framework). Also consider that, a new instance of input data may be, X=(Application Type=Web,Tool=Cucumber,
Language=Java,Report=HTML,Test
Data=XML)

The probability for the hybrid framework may be computed by referring to the frequency table for each parameter i.e. Application type as Web, Tool as Cucumber, scripting language as Java, report as HTML, and test data as XML.

$P(\text{Application Type}=\text{Web}|FW=\text{Hybrid})=5/5$ $P(\text{Tool}=\text{Cucumber}|FW=\text{Hybrid})=0/5$ (Average=0.5, as it is zero)

$P(\text{Language}=\text{Java}|FW=\text{Hyrbid})=1/5$ $P(\text{Report}=\text{HTML},FW=\text{Hyrbid})=3/5$ $P(\text{Test Data}=\text{XML},FW=\text{Hybrid})=1/5$ Additionally, the probability for the non-hybrid framework may be computed by referring to the frequency table for each parameter i.e. Application type as Web, Tool as Cucumber, scripting language as Java, report as HTML, and test data as XML.

$P(\text{Application Type}=\text{Web}|FW=\text{Non-Hybrid})=5/10$ $P(\text{Tool}=\text{Cucumber}|FW=\text{Non-Hybrid})=1/10$ $P(\text{Language}=\text{Java}|FW=\text{Non-Hybrid})=2/10$ $P(\text{Report}=\text{HTML},FW=\text{Non-Hybrid})=7/10$ $P(\text{Test Data}=\text{XML},FW=\text{Non-Hybrid})=2/10$ Therefore, P(X) for the Hybrid framework may be computed as, $$P(X) = (5/5)*(0.5/5)*(1/5)*(3/5)*(1/5)*(5/15)$$
$$= 1*0.1*0.5*0.6*.5*0.33$$
$$= 0.0049$$

The value 0.0049 represents the 'Likelihood' in the equation 2 for the hybrid framework. Thus, the value 0.0049 may represent P (X|C) P(C).

Similarly, P(X) for the Non-Hybrid framework may be computed as, $P(X)=(10/15)*(1/15)*(3/15)*(10/15)*(3/15)$
$=0.66*0.06*0.2*0.66*0.2=0.0009$ The value 0.0009 represents the 'Likelihood' in the equation 2 for the non-hybrid framework. Thus, the value 0.0009 may represent P (X|C) P(C).

After computing the Likelihood for both the hybrid framework and the non-hybrid framework, the framework prediction module 118 may divide the value of 'Likelihood' by the evidence, or 'P(X)'. The evidence may be computed by referring to 'Total' column of the frequency table for each parameter.

Therefore, P(X) for hybrid framework and non-hybrid framework may be computed as, $$P(X) = (10/15)*(1/15)*(3/15)*(10/15)*(3/15)$$
$$= 0.66*0.06*0.2*0.66*0.2$$
$$= 0.0010$$

Similarly, P(X) for non-hybrid framework may be computed as,

Therefore, the probability for predicting the hybrid framework (P (FW=Hybrid|X) may be computed as, $P(FW=\text{Hybrid}|X)=0.0049/0.0010=4.9$ The probability for predicting the non-hybrid framework (P (FW=Non-Hybrid|X) may be computed as, $P(FW=\text{Non-Hybrid}|X)=0.0009/0.0010=0.9$ As the probability for predicting the hybrid framework is 4.9 which is greater than 0.9, the framework prediction module 118 may predict the hybrid framework as the test automation framework.

After predicting the test automation framework, the obtaining module 120 may obtain one or more test scenarios from execution of the historical regression test suites. The historical regression test suites may include different test scenarios which are executed in different execution cycles of regression testing of the software application. In order to obtain the test scenarios, the obtaining module 120 may determine similar test scenarios in different execution cycles of the historical regression test suites. The similar test scenarios may be determined based on one or more similarity parameters. In an example, the similarity parameters may be similar business scenarios in the regression test suites. For example, some test scenarios which are critical to a business may be executed in every execution cycle.

Further, the number of occurrences of the similar test scenarios in different execution cycles may be computed. For example, test scenarios A1, B1, C1 may be executed in release 1 and test scenarios B2, D2, E2 may be executed in release 2. The test scenarios B1 and B2 may be determined as the similar test scenarios. The number of occurrences of B1 and B2 may be determined as two. After determining the number of occurrences of the similar test scenarios, the obtaining module 120 may obtain the similar test scenarios for building the regression test suite if the number of occurrences exceeds an occurrence threshold value. In the above example, if the occurrence threshold value is 1, then the test scenarios B1 and B2 may be obtained for building the regression test suite.

Upon obtaining the test scenarios, the obtaining module 120 may also obtain test data for each test scenario from a pre-defined database for executing the test scenarios.

After obtaining the test data and the test scenarios, the identifying module 122 may identify availability of one or more devices 104 for executing each test scenario of the one or more test scenarios based on one or more device parameters. The one or more device parameters may include, but is not limited to, geographic location of each device of the one or more devices 104 and processing power of each device. For example, if the test automation framework is deployed in a server at geographic location A, the test scenarios may be executed in a distributed method on different devices. The devices may not be present at one geographical location. The devices communicatively coupled with each other and the server may be identified for execution of the test scenarios. Thus, a pool of devices present at different geographical locations may be determined for execution of the test scenarios.

Apart from the geographical location, the processing power of each device may be determined to identify the availability of the device for execution of the test scenario. If the processing power of the device is above a threshold value, the device may be identified as available for execution of the test scenario. In one embodiment, a batch script executing on each device may determine the processing power of the device and notify this data to the test automation system 102. The identifying module 122 may determine the availability of the device based on the processing power for execution of test scenarios. If one device is determined as unavailable, the identifying module 122 may check availability of another device from the pool of devices for execution of the test scenarios.

Upon identifying the availability of the one or more devices 104, the transmitting module 124 may transmit information corresponding to the one or more test scenarios to the one or more identified devices based on the availability to automate the regression testing of the software application. If the device is determined as available, the transmitting module 124 may transmit information corresponding to the test scenarios to the device. The information corresponding to the test scenarios may include the test scenarios which are obtained for execution of the regression test suite. Upon transmitting the information corresponding to the test scenarios, the test scenarios may be executed on the identified devices for automating the regression testing of the software application.

After executing the test scenario on a device, the test automation system 102 may generate an alert for a failed execution of a test scenario. The test automation system 102 may transmit a notification to a stakeholder of the software application when a number of failed executions of the test scenario exceeds a pre-defined threshold value. For example, consider that the pre-defined threshold value is 7. If the execution of the test scenario B1 of A1, B1, and C1 fails more than 7 times, then developer or tester of the software application may be automatically notified of the failure.

In one embodiment, upon determining the failed execution of the test scenario, the test automation system 102 may automatically re-execute the test scenario associated with the failed execution.

Upon execution of the test scenarios, test automation system 102 may generate execution reports. A final execution report may contain name of the test scenario executed, duration of execution, status, screen shot of failed execution, and exact line number in a test script where failed execution occurred. All the execution reports may also comprise high rich video recorded reports. The execution report may be exportable in a shareable format such as a PDF or excel file and may be easy to merge with overall dashboard. The dashboard may display execution results in different formats. The dashboard may display 'test execution history', 'results by date', 'results by application modules' or 'results by release cycles'.

FIG. 2 is a flow diagram illustrating a method 200 for automating regression testing of a software application, in accordance with some embodiments of the present disclosure.

The method 200 may be described in the general context of computer executable instructions. Generally, computer executable instructions can include routines, programs, objects, components, data structures, procedures, modules, and functions, which perform particular functions or implement particular abstract data types. The method 200 may also be practiced in a distributed computing environment where functions are performed by remote processing devices that are linked through a communication network. In a distributed computing environment, computer executable instructions may be located in both local and remote computer storage media, including memory storage devices.

The order in which the method 200 is described is not intended to be construed as a limitation, and any number of the described method blocks can be combined in any order to implement the method 200 or alternative methods. Additionally, individual blocks may be deleted from the method 200 without departing from the spirit and scope of the subject matter described herein. Furthermore, the method 200 can be implemented in any suitable hardware, software, firmware, or combination thereof.

With reference to the FIG. 2, at block 202 input data associated with regression testing of a software application may be received. In one embodiment, the input data may be provided by a user through the I/O interface 110 of the test automation system 102. The input data may include software application type, scripting language used in development of the software application, data source, tools, report type, and testing type. Receiving of the input data is explained in detail in conjunction with the FIG. 1.

At block 204, a test automation framework may be predicted for execution of a regression test suite by analyzing the input data. In order to predict an optimal test automation framework from a set of test automation frameworks, the framework prediction module 118 may implement machine learning algorithm. In one embodiment, Naïve Bayes algorithm may be implemented for predicting the test automation framework. The framework prediction module 118 may predict the test automation framework by analyzing the input data in reference with a training data set. The predicting of the test automation framework is explained in detail in conjunction with the FIG. 1.

At block 206, one or more test scenarios may be obtained from execution of historical regression test suites upon predicting the test automation framework. In order to obtain the test scenarios, the obtaining module 120 may determine similar test scenarios in different execution cycles of the historical regression test suites. The similar test scenarios may be determined based on one or more similarity parameters. Further, the number of occurrences of the similar test scenarios in different execution cycles may be computed. After determining the number of occurrences of the similar test scenarios, the obtaining module 120 may obtain the similar test scenarios for building the regression test suite if the number of occurrences exceeds an occurrence threshold value. The obtaining of the test scenarios is explained in detail in conjunction with the FIG. 1

At block 208, availability of one or more devices 104 may be identified for executing each test scenario of the one or more test scenarios based on one or more device parameters. The one or more device parameters may include, but is not limited to, geographic location of each device of the one or more devices 104 and processing power of each device. The identifying of availability of the one or more devices 104 is explained in detail in conjunction with the FIG. 1.

At block 210, information corresponding to the one or more test scenarios may be transmitted to the one or more identified devices based on the availability to automate the regression testing of the software application. If the device is determined as available, the transmitting module 124 may transmit information corresponding to the test scenarios to the device. The information corresponding to the test scenarios may include the test scenarios which are obtained for execution of the regression test suite. Upon transmitting the information corresponding to the test scenarios, the test scenarios may be executed on the identified devices for automating the regression testing of the software application.

Upon execution of the test scenarios on the devices 104, an alert may be generated for a failed execution of a test scenario. In an embodiment, the test automation system 102 may generate an alert for a failed execution of a test scenario. The test automation system 102 may transmit a notification to a stakeholder of the software application when a number of failed executions of the test scenario exceeds a pre-defined threshold value.

In one embodiment, upon determining the failed execution of the test scenario, the test automation system 102 may automatically re-execute the test scenario associated with the failed execution.

Upon execution of the test scenarios, execution reports may be generated. In one embodiment, the test automation system 102 may generate execution reports. A final execution report may contain name of the test scenario executed, duration of execution, status, screen shot of failed execution, and exact line number in a test script where failed execution occurred.

Computer System

FIG. 3 is a block diagram of an exemplary computer system for implementing embodiments consistent with the present disclosure. Variations of computer system 301 may be used for implementing the receiving module 116, the framework prediction module 118, the obtaining module 120, the identifying module 122, and the transmitting module 124. Computer system 301 may comprise a central processing unit ("CPU" or "processor") 302. Processor 302 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 302 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 302 may be disposed in communication with one or more input/output (I/O) devices via I/O interface 303. The I/O interface 303 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 303, the computer system 301 may communicate with one or more I/O devices. For example, the input device 304 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 305 may be a printer, fax machine, video display (e.g., cathode ray tube (CRT), liquid crystal display (LCD), light-emitting diode (LED), plasma, or the like), audio speaker, etc. In some embodiments, a transceiver 306 may be disposed in connection with the processor 302. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 302 may be disposed in communication with a communication network 308 via a network interface 307. The network interface 307 may communicate with the communication network 308. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 308 may include, without limitation, a direct interconnection, local area network (LAN), wide area network (WAN), wireless network (e.g., using Wireless Application Protocol), the Internet, etc. Using the network interface 307 and the communication network 308, the computer system 301 may communicate with devices 310, 311, and 312. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 301 may itself embody one or more of these devices.

In some embodiments, the processor 302 may be disposed in communication with one or more memory devices (e.g., RAM 313, ROM 314, etc.) via a storage interface 312. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 316, user interface application 317, web browser 318, mail server 319, mail client 320, user/application data 321 (e.g., any data variables or data records discussed in this disclosure), etc. The operating system 316 may facilitate resource management and operation of the computer system 301. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 317 may facilitate display, execution, interaction, manipulation, or operation of program components through textual or graphical facilities. For example, user interfaces may provide computer interaction interface elements on a display system operatively connected to the computer system 301, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 301 may implement a web browser 318 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 301 may implement a mail server 319 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 301 may implement a mail client 320 stored program component. The mail client may be a mail viewing application, such as Apple Mail, Microsoft Entourage, Microsoft Outlook, Mozilla Thunderbird, etc.

In some embodiments, computer system 301 may store user/application data 321, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using Obj ectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described systems and methods for automating regression testing of a software application. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for automating regression testing of a software application, the method comprising:
   receiving, by a test automation computing device, a group of input parameters associated with the regression testing of the software application, wherein the group of input parameters comprises software application type, scripting language used in development of the software application, data source, tools, report type, and testing type;
   predicting, by the test automation computing device, a test automation framework for execution of a regression test suite by analyzing the input parameters using a Naive Bayes machine learning technique, wherein the test automation framework is predicted based on a training dataset relating parameters of different groups of inputs to a respective predicted test automation framework, and creating a frequency table for each parameter of each input parameters based on the training dataset, wherein the frequency tables are used to calculate the probability of predicting each type of test automation framework based on each parameter of the input data;
   obtaining, by the test automation computing device, one or more test scenarios from execution of historical regression test suites upon predicting the test automation framework;
   identifying, by the test automation computing device, availability of one or more devices for executing each test scenario of the one or more test scenarios based on one or more device parameters;
   transmitting, by the test automation computing device, information corresponding to the one or more test scenarios to the one or more identified devices based on the availability; and
   executing, by the test automation computing device, the one or more test scenarios on the identified one or more devices to automate the regression testing of the software application.

2. The method of claim 1, wherein the regression test suite is built from the one or more test scenarios.

3. The method of claim 1, wherein the one or more test scenarios are executed on the one or more identified devices for automating the regression testing of the software application.

4. The method of claim 1, wherein the automating the regression testing of the software application further comprises generating, by the test automation computing device, an alert for a failed execution of a test scenario of the one or more test scenarios.

5. The method of claim 4, further comprising automatically re-executing the test scenario associated with the failed execution.

6. The method of claim 4, wherein the generating the alert for the failed execution of the test scenario comprises transmitting, by the test automation computing device, a notification to a stakeholder of the software application when a number of failed executions of the test scenario exceeds a pre-defined threshold value.

7. The method of claim 1, wherein the obtaining the one or more test scenarios from the execution of the historical regression test suites further comprises obtaining test data for each test scenario from a pre-defined database for executing the one or more test scenarios.

8. The method of claim 1, wherein the obtaining the one or more test scenarios from the execution of the historical regression test suites comprises:
   determining, by the test automation computing device, a number of occurrences of similar test scenarios in different execution cycles, wherein the similar test scenarios are determined based on one or more similarity parameters; and
   obtaining, by the test automation computing device, the similar test scenarios if the number of occurrences exceeds an occurrence threshold value.

9. The method of claim 1, wherein the one or more device parameters comprises geographic location of each device of the one or more devices and processing power of each device.

10. A test automation computing device comprising:
   a processor; and
   a memory communicatively coupled to the processor, wherein the memory stores processor instructions, which, on execution, causes the processor to:
   receive a group of input parameters associated with the regression testing of the software application, wherein the group of input parameters comprises software application type, scripting language used in development of the software application, data source, tools, report type, and testing type;
   predict a test automation framework for execution of a regression test suite by analyzing the input parameters using a Naive Bayes machine learning technique, wherein the test automation framework is predicted based on a training dataset relating parameters of different groups of inputs to a respective predicted test automation framework, and creating a frequency table for each parameter of each input parameters based on the training dataset, wherein the frequency tables are used to calculate the probability of predicting each type of test automation framework based on each parameter of the input data;
   obtain one or more test scenarios from execution of historical regression test suites upon predicting the test automation framework;
   identify availability of one or more devices for executing each test scenario of the one or more test scenarios based on one or more device parameters;
   transmit information corresponding to the one or more test scenarios to the one or more identified devices based on the availability; and
   execute the one or more test scenarios on the identified one or more devices to automate the regression testing of the software application.

11. The test automation device of claim 10, wherein the regression test suite is built from the one or more test scenarios.

12. The test automation device of claim 10, wherein the one or more test scenarios are executed on the one or more identified devices for automating the regression testing of the software application.

13. The test automation device of claim 10, wherein the processor is further caused to generate an alert for a failed execution of a test scenario of the one or more test scenarios.

14. The test automation device of claim 13, wherein the processor is further caused to automatically re-execute the test scenario associated with the failed execution.

15. The test automation device of claim 13, wherein the processor is further caused to transmit a notification to a stakeholder of the software application when a number of failed executions of the test scenario exceeds a pre-defined threshold value.

16. The test automation device of claim 10, wherein the processor is further caused to obtain test data for each test scenario from a pre-defined database for executing the one or more test scenarios.

17. The test automation device of claim 10, wherein the processor is further caused to:
   determine a number of occurrences of similar test scenarios in different execution cycles, wherein the similar test scenarios are determined based on one or more similarity parameters; and
   obtain the similar test scenarios if the number of occurrences exceeds an occurrence threshold value.

18. The test automation device of claim 10, wherein the one or more device parameters comprises geographic location of each device of the one or more devices and processing power of each device.

19. A non-transitory computer readable medium including instructions stored thereon that when processed by at least one processor cause a device to perform operations comprising:
   receiving a group of input parameters associated with the regression testing of the software application, wherein the group of input parameters comprises software application type, scripting language used in development of the software application, data source, tools, report type, and testing type;
   predicting a test automation framework for execution of a regression test suite by analyzing the input parameters using a Naive Bayes machine learning technique, wherein the test automation framework is predicted based on a training dataset relating parameters of different groups of inputs to a respective predicted test automation framework, and creating a frequency table for each parameter of each input parameters based on the training dataset, wherein the frequency tables are used to calculate the probability of predicting each type of test automation framework based on each parameter of the input data;
   obtaining one or more test scenarios from execution of historical regression test suites upon predicting the test automation framework;
   identifying availability of one or more devices for executing each test scenario of the one or more test scenarios based on one or more device parameters;
   transmitting information corresponding to the one or more test scenarios to the one or more identified devices based on the availability; and
   executing the one or more test scenarios on the identified one or more devices to automate the regression testing of the software application.

20. The non-transitory computer readable medium of claim 19, wherein the one or more test scenarios are executed on the one or more identified devices for automating the regression testing of the software application.

\* \* \* \* \*